Dec. 7, 1965  R. B. EYERLY ETAL  3,222,061
PORTABLE AMUSEMENT RIDE
Filed Dec. 27, 1962  7 Sheets-Sheet 1

Fig. 1.

Russell B. Eyerly
Ernest M. Johnson
INVENTORS

BY Oliver D. Olson
Agent

Fig. 5.

Russell B. Eyerly
Ernest M. Johnson
INVENTORS

Agent

Dec. 7, 1965   R. B. EYERLY ETAL   3,222,061
PORTABLE AMUSEMENT RIDE
Filed Dec. 27, 1962   7 Sheets-Sheet 5

Russell B. Eyerly
Ernest M. Johnson
INVENTORS

BY

Agent

Fig. 16.

United States Patent Office 3,222,061
Patented Dec. 7, 1965

3,222,061
PORTABLE AMUSEMENT RIDE
Russell B. Eyerly and Ernest M. Johnson, Salem, Oreg., assignors to Eyerly Aircraft Co., Salem, Oreg., a corporation of Oregon
Filed Dec. 27, 1962, Ser. No. 247,664
14 Claims. (Cl. 272—29)

This invention relates to amusement rides of the Ferris wheel type, and more particularly to such a ride which is collapsible for transport over the highways.

It is a common practice among many midway operators to transport their amusement ride equipment from place to place, for use at special local events such as fairs, expositions, etc. Although many amusement rides lend themselves adequately to convenient portability, the transport of amusement rides of the Ferris wheel type heretofore has required substantial disassembly of the apparatus into its component parts. The time and personnel requirements for assembly and disassembly thus have made it economically unattractive for many midway operators to transport this type of amusement ride, particularly for short term operations.

Accordingly, it is the principal object of the present invention to provide an amusement ride of the Ferris wheel type which is capable of being collapsed to minimum size with speed and facility for convenient transport.

Another important object of the present invention is the provision of an amusement ride of the Ferris wheel type, in which a mobile trailer frame serves to support the ride both in the operative condition and in the folded condition for transport.

Still another important object of this invention is the provision of a portable amusement ride of the Ferris wheel type, which is of sturdy construction for maximum safety of operation, and requires a minimum of maintenance and repair.

The foregoing and other objects and advantages of this invention will appear from the following detailed description, taken in connection with the accompanying drawings in which.

Figure 1:
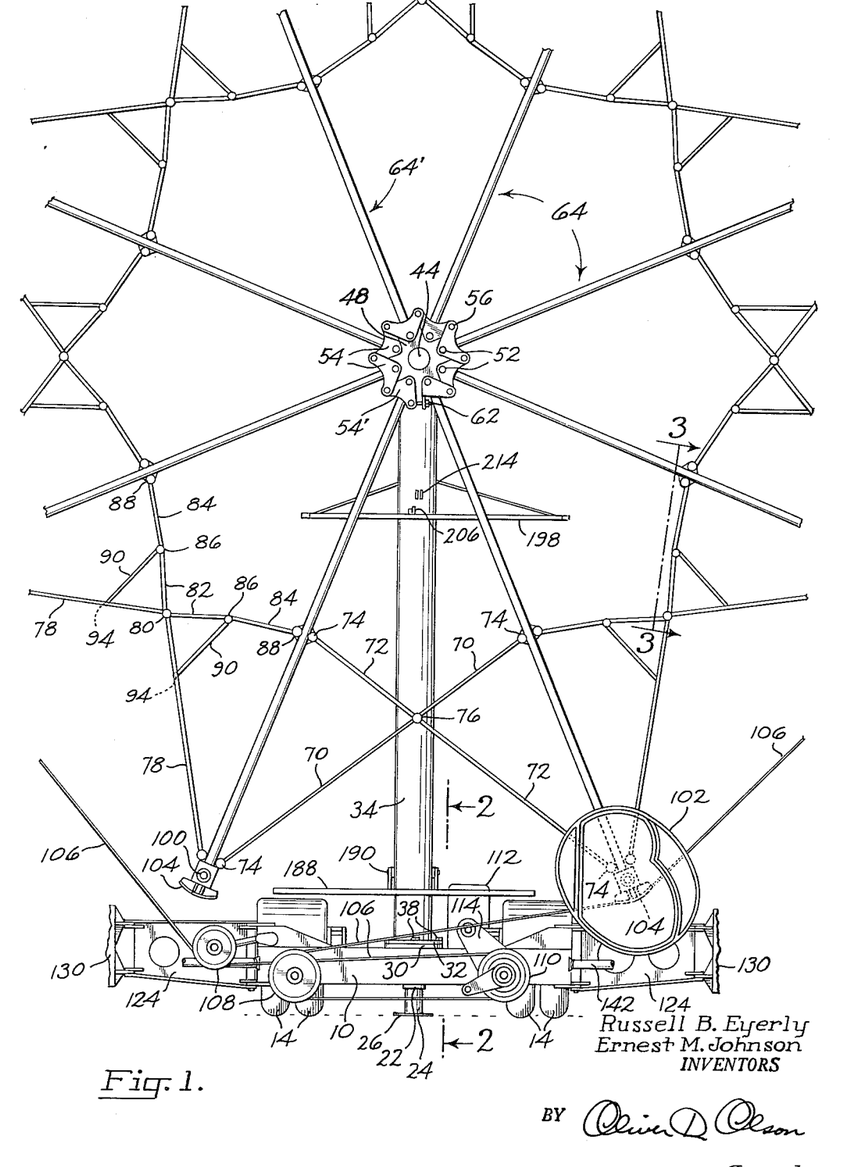
FIG. 1 is a fragmentary front elevation of a portable amusement ride embodying the features of the present invention, the same being shown in erected condition.
Figure 2:
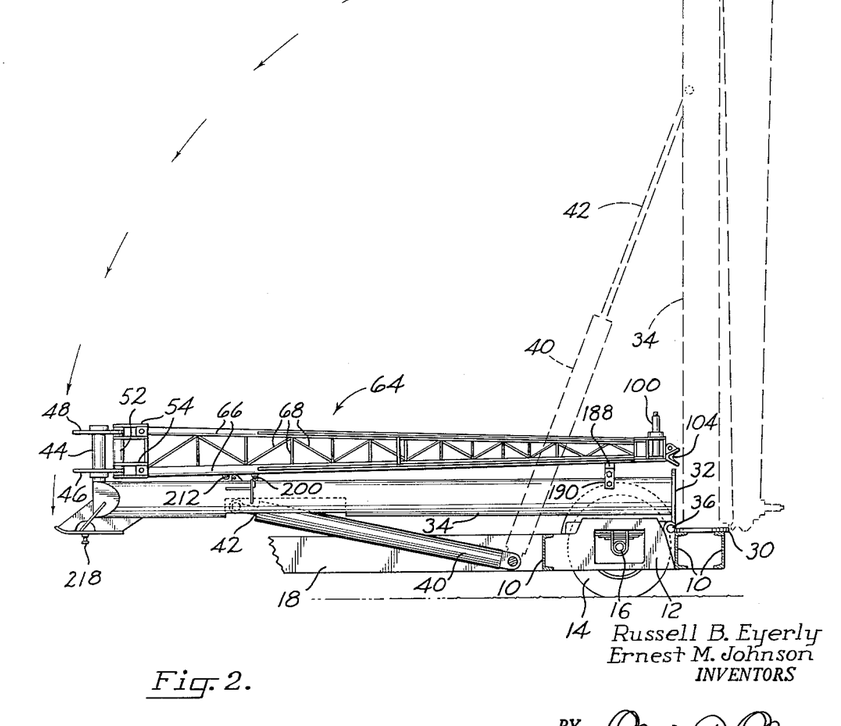
FIG. 2 is a fragmentary sectional view taken along the line 2—2 in FIG. 1 and showing the assembly in partially folded condition in full lines and in erected condition in dash lines.

Referring primarily to FIGS. 1 and 2 of the drawings, the portable amusement ride includes a supporting mobile trailer. The trailer includes the box frame assembly of the transverse beams 10 and connected side beams 12, the latter supporting the ground wheels 14 by means of spring connected axles 16.

Extending forwardly from the box frame is the central longitudinal reach. The reach includes a pair of laterally spaced elongated beams 18 which extend forwardly from the box frame and are reinforced by means of the angle braces 20. The forward end of the reach supports an hydraulic cylinder 22 (FIGS. 14 and 15) in which a piston 24 reciprocates on a vertical axis. The bottom end of the piston carries a ground engaging base plate 26, and the piston-cylinder unit functions to level the trailer in the longitudinal direction.

A mounting plate 30 is secured to the rearward transverse box frame beams 10 for supporting the base flange 32 of the elongated column 34. The mounting plate and base flange are interconnected pivotally by means of the hinge 36 which is located on the forward side of the mounting plate. The hinge thus permits the column to be pivoted between the folded, horizontal position illustrated in full lines in FIG. 2, and the vertically erect position illustrated in dash lines. Additional bolts 38 extend through the mounting plate and base flange for securing the column in the vertical position. The column is moved between said positions by means of the extensible hydraulic motor which includes the elongated cylinder 40 and associated piston rod 42 which is reciprocative relative to the cylinder in well known manner. The cylinder and piston rod assembly pivotally interconnect the trailer frame and column, as best illustrated in FIG. 2.

The top end of the column supports shaft 44 the axis of which is disposed substantially normal to the column and to the pivot axis of the hinge 36. The shaft, in turn, rotatably supports the spaced sprocket wheels 46 and 48 the notches 50 of which are adapted to freely receive the transverse pins 52 which interconnect the apices of spaced pairs of links 54. The links are interconnected pivotally by means of pins 56, and the opposite end links 54' are releasably connected together by means of a bolt 58 which extends from one of the pins 56 freely through an opening in the tab 60 of the opposite end link. The bolt receives the locking nut 62 by which to secure the link assembly together as a continuous chain.

Figure 3:
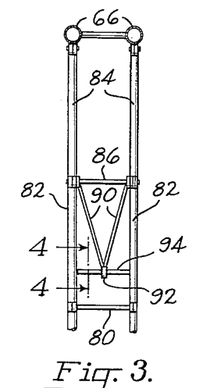
FIG. 3 is a sectional view taken along the line 3—3 in FIG. 1.
Figure 4:
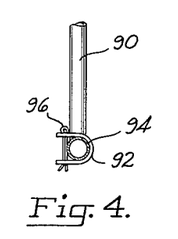
FIG. 4 is a fragmentary sectional view taken along the line 4—4 in FIG. 3.

Secured to each pair of links is a radial spoke structure 64 which includes the spaced rods 66 interconnected by the structural framework 68. The spokes projecting from the end links of the chain are interconnected detachably by means of the crossed brace rods 70, 72 which are anchored to the spokes by means of pins 74 and are also connected together pivotally intermediate their ends by means of the pin 76. All of the other spokes are interconnected by means of the assembly of outer rods 78 connected together pivotally at their inner ends by means of the pin 80, and the inner pair of rods 82, 84 which are joined together by the pivot pin 86 and which interconnect the spaced pivot pins 80 and 88. A locking frame, formed of the rods 90 (FIG. 3), is mounted on each pivot pin 86 at the diverging ends of the rods, and the converging ends of the rods are joined by a C-shaped yoke 92. This yoke is adapted to receive the transverse rod 94 extending between the spaced pairs of brace rods 78 and to be secured releasably thereto by such means as the cotter pin 96. It is by means of these locking frames 90 that the entire spoke assembly is maintained rigidly in erected condition. Moreover, it is by means of these locking frames that the spoke assembly may be folded quickly and easily, as explained more fully hereinafter.

The outer end of each spoke structure 64 supports a carriage carrier stub shaft 100 which extends substantially parallel to the main support shaft 44 and which serves to mount a seat or other form of carriage 102 designed to support one or more persons participating in the ride.

Also supported at the outer end of each spoke structure is a guide shoe 104 which forms an arcuate groove for frictionally receiving the flexible drive cable 106. This cable encircles the spokes and is trained over the guide pulleys 108 and drive pulley 110, the latter being driven from a gasoline engine 112 or other suitable source of power, through the gear reduction unit 114. It is by this arrangement of the drive cable that the assembly of spokes and supported carriages is rotated about the main shaft 44.

The effective length and width dimensions of the supporting trailer are increased to a substantial degree by means of elongated outriggers to insure stability of the ride. Each outrigger (FIG. 6) includes an inner section 120 supported pivotally at its forward end on the forward side of the box frame, by means of the pivot pins 122. The rearward end of the inner section 120 is connected releasably to the rearward side of the box frame by means of the link member 124 and the interconnecting pins 126. The inner outrigger section thus is supported on the trailer in a position extending angularly outward and rearward relative to the trailer.

The outrigger also includes an outer section 130 pivotally connected to the inner section 120 adjacent their bottom sides, by means of the pin 132. An assembly of hydraulic cylinder 134 and piston rod 136 pivotally interconnects the inner section 120 and the outer section 130, for the purpose of pivoting the outer section about the pin 132, to adjust the outer section to variations in contour of the ground, in order to maintain the column 34 in a vertically plumb condition. Overlapping portions of the inner and outer sections of the outrigger are provided with a plurality of openings 140, whereby to provide a registering pair of openings for almost any position of adjustment of the outer section of the outrigger. A bolt then may be inserted through the registering pair of openings to pin the sections securely together and thus permit relieving the pressure on the hydraulic cylinder 134. A brace rod 142 pivotally interconnects the outer section 130 and the trailer frame 10 for additional stability.

The pair of outriggers project rearwardly and outwardly relative to the trailer frame, a substantial distance, and terminate at their outer ends in ground-engaging plates 144.

The longitudinal beams 18 also support a pair of longitudinally spaced brackets 150. Bearings carried by these brackets rotatably support a pair of elongated tubular supports 152 and 154 which extend in the longitudinal direction of the trailer symmetrically on opposite sides of the reach. Each tubular support mounts the inner end of a pair of longitudinally spaced carriage carrier arms 156, each of which supports at its outer end a longitudinally elongated arm 158. Adjacent the opposite ends of each of these arms is an outwardly projecting carriage support stub shaft 160, preferably identical to the stub shafts 100 on the outer ends of the spokes. These stub shafts 160 serve to support the carriages 102 when the assembly is to be folded for transport.

In order to facilitate transfer of the carriages between the spoke shafts 100 and the storage shafts 160, preliminary to folding and erection of the spoke assembly, a simplified boom assembly is provided. An upstanding pivot shaft 162 is mounted at opposite sides of the box frame of the trailer, at the forward end thereof, the shaft being adapted to freely receive the supporting sleeve 164 for rotation thereon. An inner boom arm 166 is connected pivotally to the sleeve for adjustment between the folded position illustrated in FIG. 6 and an operative position inclining upwardly toward its outer end. This operative position is maintained by means of the connecting rod 168 which is secured at one end to the boom arm and at the opposite end releasably to a flange projecting from the sleeve, as illustrated.

The outer end of the inner boom arm supports a stub shaft 170 which projects obliquely outward therefrom and rotatably supports a sleeve 172 secured to the inner end of the outer boom arm 174. A reinforcing rod or cable 176 extends from the outer end of the boom arm to a point on the sleeve 172 spaced from the attachment of the outer boom arm. The outer end of the boom arm 174 is apertured for receiving a cable hook or the like, by which to releasably support the carriages.

By means of the boom assembly just described, one person may transfer the carriages between the shafts 100 and 160, and therefore may also fold and erect the entire assembly with speed and facility.

The tubular supports 152, 154 also securely mount the levers 180 to which the opposite ends of the assembly of links 182 are connected. The central link 182' of the assembly forms a saddle for engagement by the actuator bar 184 projecting from the column 34. Thus, as the column is lowered toward the position illustrated in FIG. 2, by means of the power cylinder 40, the actuator bar engages the saddle link (FIG. 14) and drives it downward, thereby rotating the tubular supports 152, 154 and the attached arms and supported carriages, to the folded position indicated in FIG. 15. The folding of the carriage support arms to the position illustrated in FIG. 15 is deferred until the spoke assembly is folded, as follows:

After the carriages have been removed from the spoke assembly for storage on the shafts 160, the spoke assembly is rotated to remove the surrounding cable 106 and to position the end links 54' and the interconnecting bolt 58 vertically above the supporting shaft 44, i.e. substantially 180° from the position illustrated in FIG. 1, with the spoke structure 64' extending from the middle link of the chain being aligned with the column 34. The lower transverse support bar 188 then is swung upward about its pivot mounting 190 on the column (FIG. 2) to engage said aligned spoke 64'. The column then is lowered, by operation of cylinder 40, to the position indicated in FIG. 14, which is slightly inclined from horizontal.

Referring now to FIGS. 9-13, a transverse mounting bracket 192 is secured to the column adjacent the upper end of the latter and supports, in the end bearings 194, a transverse shaft 196. Secured to the shaft between the end bearings is an elongated sleeve 198 provided with a projecting arcuate cam 200 which extends the full length of the sleeve. Projecting from the cam adjacent the mid point thereof is a bearing 202 which slidably mounts a shaft 204 carrying a roller 206 at one end the shaft 204 being nonrotatably mounted within the bearing 202.

Figure 12:
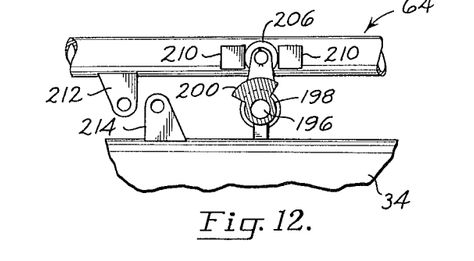
FIGS. 12 and 13 are fragmentary sectional views similar to FIG. 11 and showing the locking components of FIG. 11 in other positions of adjustment.
Figure 13:
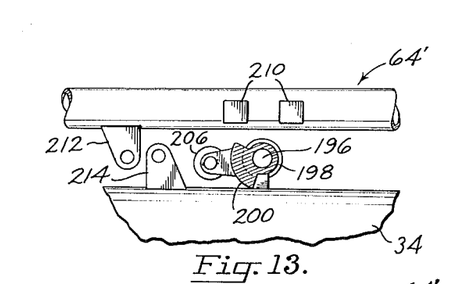

A hollow socket member 208 also projects from the sleeve 198 adjacent one end of the latter, and is adapted to receive an elongated bar (not shown) by which to rotate the sleeve from the position of FIG. 13 wherein the cam 200 is retracted from engagement with the spoke 64', to the extended position of FIG. 12 wherein the cam engages and supports the spoke adjacent the upper end of the latter.

Rotation of the sleeve 198 to the position of FIG. 12 is preceded by retraction of the roller 206 toward its supporting bearing 202, so that it clears the laterally projecting blocks 210 which are mounted in longitudinally spaced relation on the central spoke structure 64'. The roller then is extended into the space between the blocks.

The nut 62 on the connecting bolt 58 of the end spoke links then is removed to permit disengagement of the end links. Additionally, three of the four pins 74 connecting the crossed rods 70, 72 to the adjacent spokes, are removed to permit the rods to be folded against the spoke still connected to them. The cotter pins 96 on the yokes of the locking frames 90 are then removed to permit successive folding of the spokes on opposite sides of the center spoke 64', substantially to the position illustrated in FIG. 5. However, it is to be noted from FIG. 12 that the center spoke is still retained in the position in which the pin 52 carried by the center link still engages the sprocket 48. The sleeve 198 now is rotated, with the aid of the bar previously described, clockwise to the position illustrated in FIG. 11. During this rotation of the sleeve the simultaneous arcuate movement of the roller 206 (confined between the blocks) has caused the center spoke to be moved away from the sprocket to the position illustrated in FIG. 5. In this position the openings in the lugs 212, 214 projecting from the column 34 and from the spoke 64', respectively, have been brought into alignment, for the reception of a locking bolt. Thus, the entire assembly of spokes is disengaged from the sprocket and is supported entirely upon the transverse bar 183 and cam 200.

By removing the spoke assembly from the sprocket for transport, the sprocket shaft 44 is relieved of all stresses which otherwise would be imposed upon it by the weight of the spoke assembly. Accordingly, the bearing supports for the shaft need not be designed to accommodate such stresses.

Figure 5:
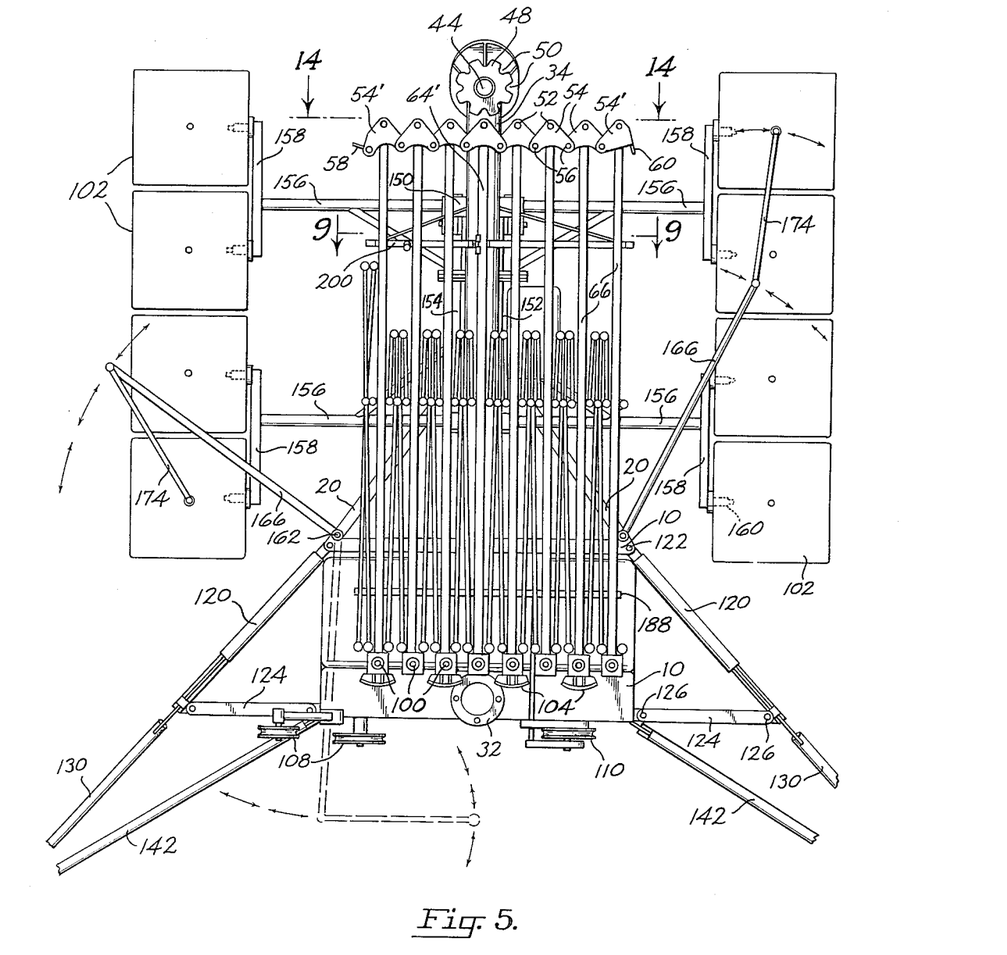
FIG. 5 is a fragmentary plan view of the partially folded assembly of FIG. 2.
Figure 14:
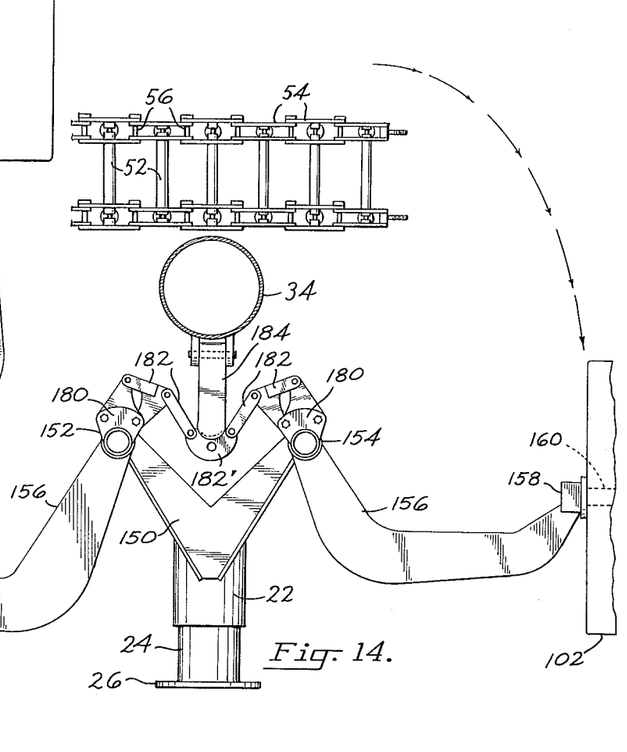
FIG. 14 is a fragmentary sectional view taken along the line 14—14 in FIG. 5 and showing the arrangement of the rider carriage supports preliminary to folding.
Figure 15:
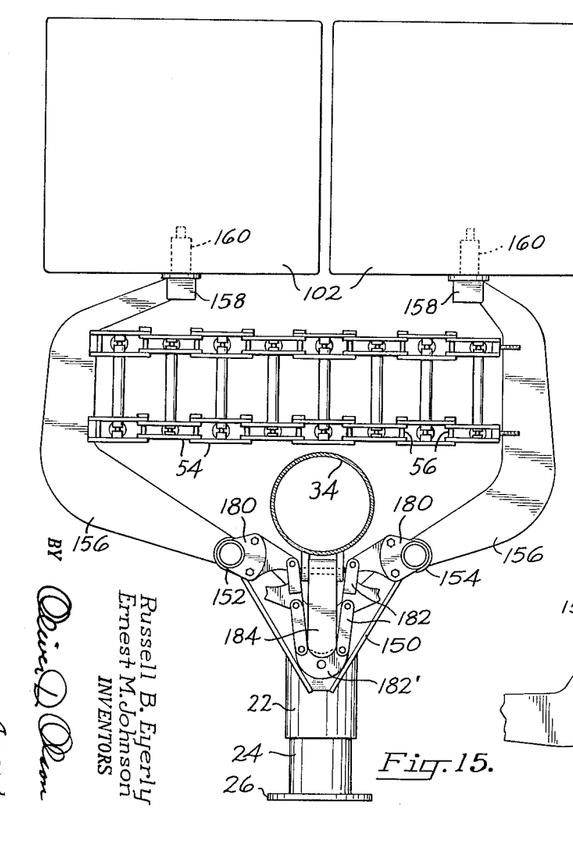
FIG. 15 is a sectional view similar to FIG. 14 and showing the rider carriage supports in folded condition.

It is to be noted from FIG. 15 that, after the spokes have been folded to the position illustrated in FIG. 5, the operating cylinder 40 for the column 34 is actuated to draw the column further downward from the position illustrated in FIG. 14 to the position illustrated in FIG. 15, thereby rotating the arms 156 and supported carriages upward to the folded position illustrated in FIG. 15. In this position the intermediate portions of the arms confine the folded assembly of spokes between them, whereby to prevent lateral displacement of the folded spokes.

It is to be noted from FIG. 5 that alternate ones of the guide shoes 104 have been removed from the spokes to permit folding to minimum lateral dimension.

Figures 6, 7, 8:
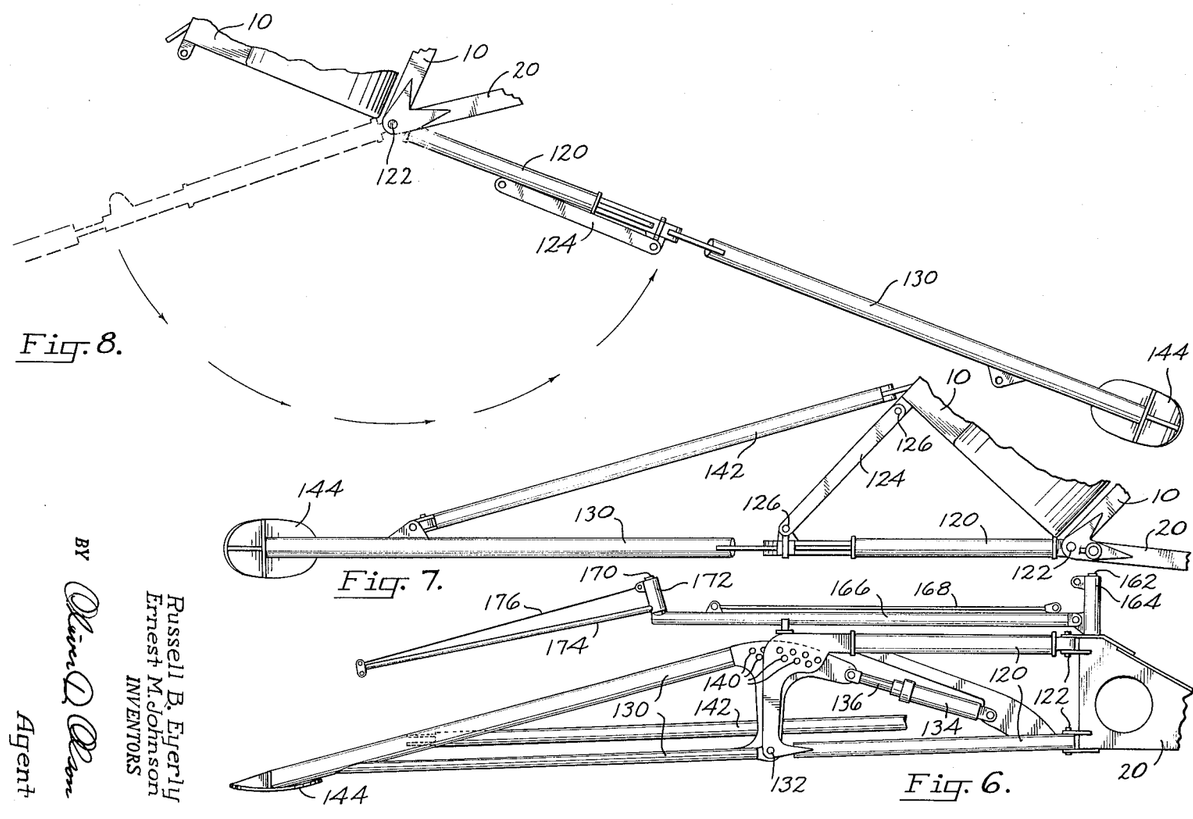
FIG. 6 is a fragmentary side elevation of an outrigger support forming a part of the assembly.
FIG. 7 is a fragmentary plan view of the outrigger support shown in FIG. 6 with the deletion of the carriage transfer means.
FIG. 8 is a fragmentary plan view showing the outrigger support of FIG. 7 in folded condition in full lines and in extended condition in dash lines.
Figure 9:
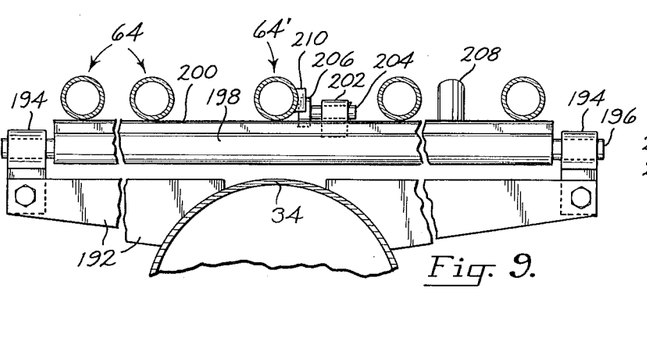
FIG. 9 is a fragmentary foreshortened sectional view taken along the line 9—9 in FIG. 5.
Figure 10:
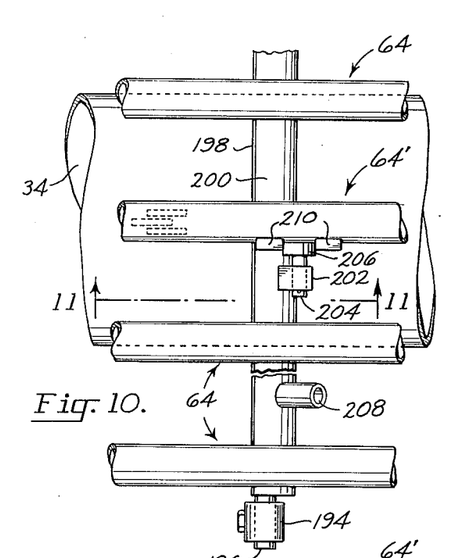
FIG. 10 is a fragmentary foreshortened plan view as viewed from the top in FIG. 9.
Figure 11:
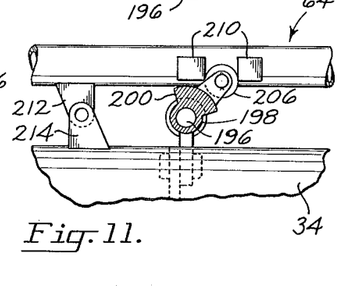
FIG. 11 is a fragmentary sectional view taken along the line 11—11 in FIG. 10.

After the carriage supporting arms 156 have been elevated to the position illustrated in FIG. 15, the outrigger assemblies are folded against the longitudinal sides of the trailer by removing the brace rods 142 and uncoupling the links 124 from the trailer frame 10, and then rotating the assemblies about the supporting pins 122, as illustrated in FIG. 8. The outriggers and column 34 may be secured releasably to the trailer by any conventional means, for stability during transport. A trailer hitch component 218 is provided at the outer end of the column for connection to a towing vehicle.

Unfolding of the assembly from the collapsed condition to the fully erected condition for operation, is substantially the reverse of the procedure outlined hereinbefore, as will be apparent.

Figure 16:
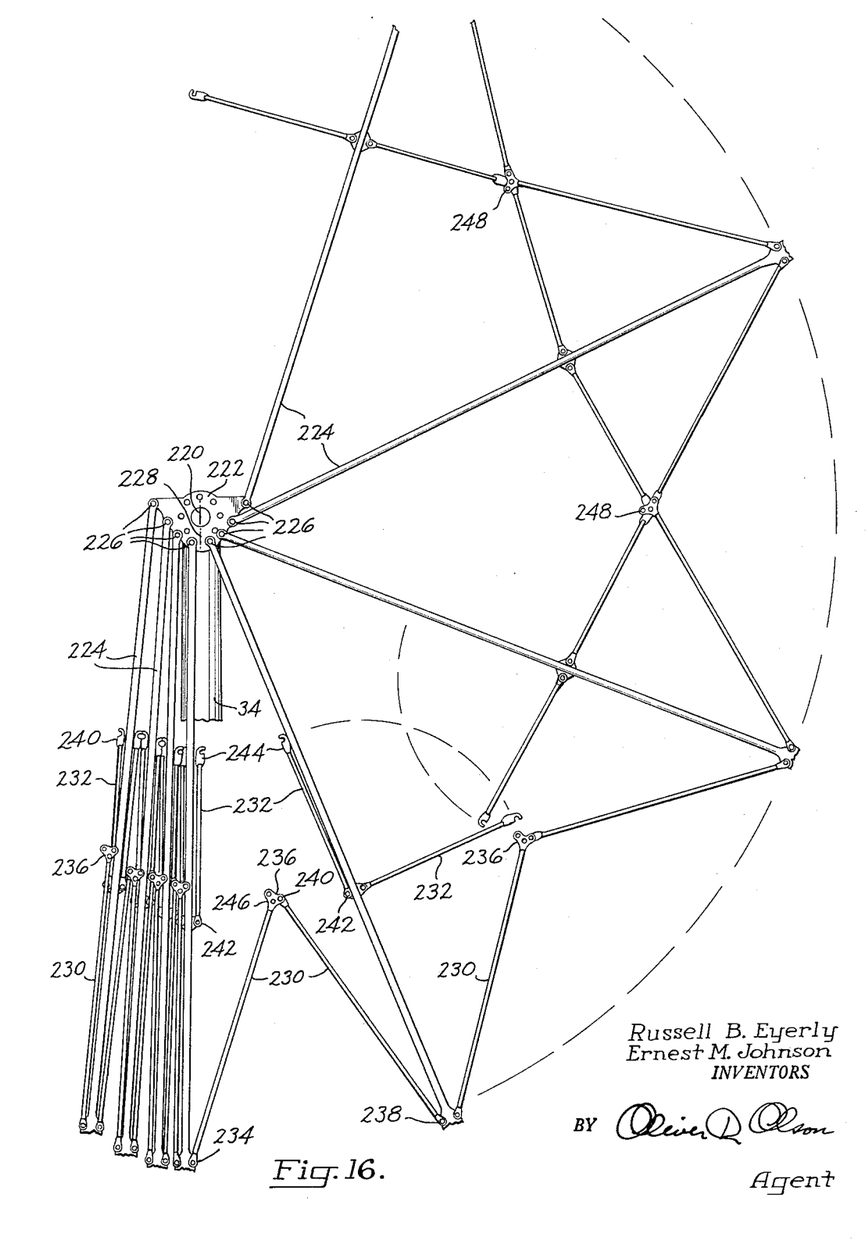
FIG. 16 is a fragmentary plan view, similar to FIG. 5, showing an alternative construction for the wheel spokes and hub assembly.

Referring now to FIG. 16 of the drawings, there is illustrated an alternative structural arrangement for the spoke assembly. In this embodiment the shaft 220 at the top of the column 34 supports a hub 222 on which the spokes 224 are pivotally secured at their inner ends. The hub has a center line 228 which passes through the axis of shaft 220 and which is capable of being aligned with the longitudinal axis of the column 34, and the pivot supports 226 are disposed symmetrically on opposite sides of this center line at progressively greater distances from the axis of the shaft 220. This arrangement permits folding of the spokes generally parallel to the column.

Adjacent spokes 224 are releasably interconnected by means of the outer rods 230 and inner rods 232. One of the outer rods is pivotally connected to the outer end of a spoke, by means of a pin 234, and the inner end of the rod carries a hollow coupler 236. The cooperating outer rod is connected at its outer end to the outer end of the adjacent spoke, by means of the pin 238, and its inner end is pivotally attached to the coupler, by means of the pin 240. The inner rods are pivotally attached, one to each of the adjacent spokes, by means of the pins 242, and their inner ends carry hook shaped connectors 244 which are adapted to engage around a pin 246 extending through the hollow coupler. A removable locking pin 248 extends through aligned openings in the coupler, adjacent the outer sides of the hook connectors 244, to releasably secure the latter in locked engagement on the pin 246.

Thus, to fold the spoke assembly after the column has been lowered to the substantially horizontal position illustrated in FIG. 14, the assembly is rotated to align the center line 228 of the hub with the column. The pin 240 connecting the outer rods 230 associated with the outwardmost pair of spokes 224 then is removed to permit folding of the spokes inwardly toward the column. By removing the locking pins 248 the inner rods 232 may be swung inwardly away from the couple 236 and along side their connected spokes. The outer rods 230 then fold inwardly as the adjacent spokes are drawn together.

As in the embodiment first described, the outer ends of the spokes 224 carry mounting shafts 100 for the carriages, as well as guide shoes 104 for the drive cable.

The spoke assembly illustrated in FIG. 16 is somewhat simpler to fold and unfold than is the assembly illustrated in FIG. 1. However, since the spoke assembly is attached permanently to the supporting shaft 220, greater bearing support for the shaft is required to sustain the stresses imposed upon it by the folded assembly during transport.

It will be apparent to those skilled in the art that various changes may be made in the details of construction described hereinbefore, without departing from the spirit of this invention and the scope of the appended claims.

Having now described our invention and the manner in which it may be used, what we claim as new and desire to secure by Letters Patent is:

1. A portable amusement ride, comprising a frame, an elongated column supported at its lower end on the frame for movement between an operative, vertical position and a folded, substantially horizontal position over the frame, rotary spoke support means at the upper end of the column, means mounting a plurality of spokes on the support means for adjustment between an operative position in which the spokes radiate outwardly from the support means in circumferentially spaced relation, and a folded position in which the spokes are disposed substantially parallel to each other and to the column, a plurality of carriages, support means on each spoke for detachably mounting a carriage when the spokes are in unfolded operative position, a pair of carriage carriers, spaced support means on the carriage carriers for detachably mounting the carriages, and pivot means mounting the carriage carriers on the frame, one on each side of the column when the latter is folded, for movement of the spaced support means thereon between a position extending laterally from the frame for mounting and dismounting carriages and a transport position extending above the frame and column when the latter is folded.

2. The portable amusement ride of claim 1 wherein the frame comprises a mobile vehicle.

3. The portable amusement ride of claim 1 including hinge means interconnecting the column and frame for pivotal movement of the column on an axis substantially normal to the rotary axis of the spoke support means.

4. The portable amusement ride of claim 1 including drive means interconnecting the column and frame for moving the column between said operative and folded positions.

5. The portable amusement ride of claim 1 including lever means on the carriage carriers disposed for engagement by the column for moving the carriage support means on the carriers between said positions of extension during folding and unfolding of the column.

6. The portable amusement ride of claim 1 wherein the spoke support and mounting means includes a plurality of links interconnected to form a chain, each link supporting the inner end of a spoke, a sprocket mounted rotatably at the upper end of the column and adapted to receive the chain freely therearound, connector means releasably interconnecting the opposite ends of the chain, and drive means interengaging the column and the spoke supported by a link intermediate the ends of the chain, the drive means being operable to move the spoke and attached link radially toward and away from the sprocket.

7. The portable amusement ride of claim 1 wherein each spoke is a longitudinally rigid member and the spoke support means includes a hub mounted rotatably at the upper end of the column and having a center line capable of alignment with the column, and a plurality of spoke pivot means on the hub on opposite sides of said center line and spaced apart progressively outward from said center line at progressively increassng distances from the rotation axis of the hub.

8. The portable amusement ride of claim 1 including locking means releasably interconnecting adjacent spokes for securing the latter in said operative position.

9. The portable amusement ride of claim 1 including outrigger members mounted pivotally on the frame for movement between a retracted position adjacent opposite sides of the frame and an extended position outwardly from the frame.

10. A portable amusement ride, comprising a frame, an elongated column supported at its lower end on the frame for pivotal movement on an axis extending transversely of the frame between an operative, vertical position and a folded, substantially horizontal position longitudinally of and over the frame, rotary spoke support means mounted at the upper end of the column for rotation on an axis substantially normal to the pivot axis of the column, means mounting a plurality of spokes on the support means for adjustment between an operative position in which the spokes radiate outwardly from the support means in circumferentially spaced relation, and a folded position in which the spokes are disposed in a substantially horizontal plane substantially parallel to each other and to the folded column, a plurality of carriages, and support means on each spoke for detachably mounting a carriage when the spokes are in unfolded operative position.

11. The portable amusement ride of claim 10 wherein the spoke support and mounting means includes a plurality of links interconnected to form a chain, each link supporting the inner end of a spoke, a sprocket mounted rotatably at the upper end of the column and adapted to receive the chain freely therearound, connector means releasably interconnecting the opposite ends of the chain, and drive means interengaging the column and the spoke supported by a link intermediate the ends of the chain, the drive means being operable to move the spoke and attached link radially toward and away from the sprocket.

12. The portable amusement ride of claim 10 wherein each spoke is a longitudinally rigid member and the spoke support means includes a hub mounted rotatably at the upper end of the column and having a center line capable of alignment with the column, and a plurality of spoke pivot means on the hub on opposite sides of said center line and spaced apart progressively outward from said center line at progressively increasing distances from the rotation axis of the hub.

13. The portable amusement ride of claim 10 including a pair of carriage carriers, spaced support means on the carriage carriers for detachably mounting the carriages, and pivot means mounting the carriage carriers on the frame, one on each side of the column when the latter is folded, on axes extending longitudinally of the frame, for movement of the spaced support means thereon between a position extending laterally from the frame for mounting and dismounting carriages and a transport position extending above the frame and column when the latter is folded.

14. The portable amusement ride of claim 13 including lever means on the carriage carriers disposed for engagement by the column for moving the carriage support means on the carriers between said positions of extension during folding and unfolding of the column.

References Cited by the Examiner
UNITED STATES PATENTS
2,590,934   4/1952   Catlett ________________ 272—29

RICHARD C. PINKHAM, *Primary Examiner.*